(12) United States Patent
Scherpa

(10) Patent No.: US 8,903,809 B2
(45) Date of Patent: *Dec. 2, 2014

(54) CONTEXTUAL SEARCH HISTORY IN COLLABORATIVE ARCHIVES

(71) Applicant: International Business Machines Corporation, Armonk, NY (US)

(72) Inventor: Josef A. Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,093

(22) Filed: Nov. 15, 2013

(65) Prior Publication Data

US 2014/0143234 A1 May 22, 2014

Related U.S. Application Data

(63) Continuation of application No. 13/678,657, filed on Nov. 16, 2012.

(51) Int. Cl.
*G06F 7/00* (2006.01)
*G06F 17/30* (2006.01)
*H04L 12/58* (2006.01)

(52) U.S. Cl.
CPC .......... *G06F 17/30554* (2013.01); *H04L 51/04* (2013.01)
USPC ......................................... 707/722; 707/726

(58) Field of Classification Search
CPC .................... G06F 17/30867; G06F 17/30864; G06F 17/30312
See application file for complete search history.

(56) References Cited

U.S. PATENT DOCUMENTS

| 7,503,007 | B2 | 3/2009 | Goodman et al. | |
|---|---|---|---|---|
| 7,707,226 | B1 * | 4/2010 | Tonse | 707/796 |
| 8,150,868 | B2 * | 4/2012 | Richardson et al. | 707/767 |
| 8,631,001 | B2 * | 1/2014 | Lawrence et al. | 707/723 |
| 2006/0271520 | A1 | 11/2006 | Ragan | |
| 2008/0114758 | A1 | 5/2008 | Rupp et al. | |
| 2012/0066340 | A1 * | 3/2012 | Armstrong et al. | 709/217 |
| 2012/0331404 | A1 * | 12/2012 | Buford et al. | 715/757 |

OTHER PUBLICATIONS

U.S. Appl. No. 13/678,657, filed Nov. 16, 2012 entitled "Contextual Search History in Collabrative Archives".

* cited by examiner

*Primary Examiner* — Tony Mahmoudi
*Assistant Examiner* — Tuan A Pham
(74) *Attorney, Agent, or Firm* — Ryan Lewis; Arnold Bangali

(57) ABSTRACT

A computing system executes an instant message session between one or more users of the one or more collaborative tools. The computer system further examines information from instant messages in a message window of the instant message session. In addition, the computer system identifies at least one keyword data of the examined information of the instant messages. The computer system queries a first repository for related content data that matches the at least one keyword data. The computer system also generates one or more contextual search results based on the match. Furthermore, the computer system transmits the generated one or more contextual search results for display on the one or more collaboration tools.

5 Claims, 6 Drawing Sheets

CONTEXTUAL SEARCH HISTORY IN COLLABORATIVE ARCHIVES

CROSS REFERENCE TO RELATED APPLICATION

This application is a continuation of U.S. patent application Ser. No. 13/678,657 filed Nov. 16, 2012 the entire content and disclosure of which is incorporated herein by reference.

FIELD OF THE INVENTION

The present invention relates generally to messaging communication systems, and more particularly to generation of related contextual search results during instant messaging sessions of one or more collaborative tools based on keyword data of requestors or responders of the instant messaging sessions.

BACKGROUND OF THE INVENTION

The Internet is a global network of computers and networks joined together by gateways that handle data transfer and the conversion of messages from a protocol of a sending network to a protocol used by a receiving network. For example, one or more computers can communicate with other computers over the Internet.

Information between computers travels over the Internet through a variety of languages also referred to as protocols. Instant messaging is a form of communication that travels over the Internet. Instant messaging also offers transmission of information between one or more users via collaborative messaging tools. Moreover, in business or personal settings, individuals frequently collaborate and share information over the Internet via the collaborative messaging tools. Furthermore, collaborative messaging tools, can include, for instance, IBM® Lotus® Sametime® (IBM, Lotus and Sametime are registered trademarks of International Business Machines Corporation in the United States, other countries of both). The collaborative messaging tools can also be adapted to allow users to communicate in real-time with other users through social networking websites, computing environments, cell phones, and/or other communication devices.

SUMMARY

Embodiments of the present invention disclose a method, computer system, and computer program product for generation of related content during an instant message communication between collaborative tools. In one embodiment, a method is provided for generating related content during an instant message communication between collaborative tools. The method comprises a computer system executing an instant message session in a requestor message program of a first collaborative tool of one or more collaborative tools between one or more users of the one or more collaborative tools. The method further comprises the computer system executing the instant message session in a responder message program of a second collaborative tool of one or more collaborative tools. The method further comprises the computer system examining information from instant messages in a message window of the instant message session. The method further comprises the computer system identifying at least one keyword data of the examined information of the instant messages. The method further comprises the computer system querying a first repository for a first related content data that matches the at least one keyword data. The method further comprises the computer system generating one or more contextual search results based on the match. The method further comprises the computer system transmitting the generated one or more contextual search results for display on the one or more collaboration tools. The method further comprises the computer system annotating the generated one or more contextual search results of the display one or more collaboration tools. The method further comprises the computer system storing the generated one or more contextual search result in storing the instant message session. The method further comprises the computer system querying a second repository for a second related content data that matches the at least one keyword data. The method further comprises the computer system updating the generated one or more contextual search results with the queried second related content data that matches the at least one keyword data. The method further comprises the computer system displaying an alert in the one or more collaboration tools, wherein the alert indicates the availability of the update to the generated one or more contextual search results.

In another embodiment, a computer system is provided for generating related content during an instant message communication between collaborative tools. The computer system comprises of one or more processors, one or more computer-readable memories, one or more computer-readable tangible storage devices and program instructions which are stored on at least one of the one or more storage devices for execution by at least one of the one or more processors via at least one of the one or more memories. The computer system further comprises executing an instant message session in a requestor message program of a first collaborative tool of one or more collaborative tools between one or more users of the one or more collaborative tools. The computer system further comprises executing the instant message session in a responder message program of a second collaborative tool of one or more collaborative tools. The computer system further comprises examining information from instant messages in a message window of the instant message session. The computer system further comprises identifying at least one keyword data of the examined information of the instant messages. The computer system further comprises querying a first repository for a first related content data that matches the at least one keyword data. The computer system further comprises generating one or more contextual search results based on the match. The computer system further comprises transmitting the generated one or more contextual search results for display on the one or more collaboration tools. The computer system further comprises annotating the generated one or more contextual search results of the display one or more collaboration tools. The computer system further comprises storing the generated one or more contextual search result in storing the instant message session. The computer system further comprises querying a second repository for a second related content data that matches the at least one keyword data. The computer system further comprises updating the generated one or more contextual search results with the queried second related content data that matches the at least one keyword data. The computer system further comprises displaying an alert in the one or more collaboration tools, wherein the alert indicates the availability of the update to the generated one or more contextual search results.

In another embodiment a computer program product is provided for generating related content during an instant message communication between collaborative tools. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises executing an instant message session in a requestor message program of a first collaborative tool of one or more collaborative tools between one or more users of the one or more collaborative tools. The computer program product further comprises executing the instant message session in a responder message program of a second collaborative tool of one or more collaborative tools. The computer program product further comprises examining information from instant messages in a message window of the instant message session. The computer program product further comprises identifying at least one keyword data of the examined information of the instant messages. The computer program product further comprises querying a first repository for a first related content data that matches the at least one keyword data. The computer program product further comprises generating one or more contextual search results based on the match. The computer program product further comprises transmitting the generated one or more contextual search results for display on the one or more collaboration tools. The computer program product further comprises annotating the generated one or more contextual search results of the display one or more collaboration tools. The computer program product further comprises storing the generated one or more contextual search result in storing the instant message session. The computer program product further comprises querying a second repository for a second related content data that matches the at least one keyword data. The computer program product further comprises updating the generated one or more contextual search results with the queried second related content data that matches the at least one keyword data. The computer program product further comprises displaying an alert in the one or more collaboration tools, wherein the alert indicates the availability of the update to the generated one or more contextual search results.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

DETAILED DESCRIPTION

Embodiments of the present invention comprise one or more circuits or subassemblies of circuits as well as methods of operation that are executed to enable generation of related content based on keyword data of one or more instant messages during an instant message session between requestors and responders of the instant message sessions conducted on one or more collaborative devices.

The present invention further includes examination of information of any of the keyword data of the instant messages entered as an entry in a message window of the one or more collaborative tools. The keyword data includes at least one text content including, for example, words or phrases of the one or more instant messages. The at least one text content is recognized as the keyword data based on the one or more instant messages in the message window. The keyword data can be visually displayed in bold letters of the message window. The message window can be a thread window for entering the instant message. For example keyword data of the examined information is annotated or identified in bold letters as it is entered in a window of the instant message session of the one or more collaboration tools, and wherein the at least one keyword data of the instant messages is uniquely displayed using a different visual distinction from other information of the instant messages.

The message window can also be utilized for transmitting the one or more instant messages for display on the one or more collaborative tools. The conversation window can be an instant message pane for displaying the one or more instant messages to the requestor or responders of the instant message session. Furthermore, embodiments of the present invention are adapted to search or query internal and external databases for related content that matches the at least one text content of the keyword data. The matched related content of the at least one text content of the keyword data are further transmitted to conversation window of the one or more collaborative tools during the instant messaging sessions. The matched related content of the at least one text of the keyword data are stored and asynchronously updated in the repository for future retrieval, as detailed below, in accordance with embodiments of the present invention.

Figure 1:
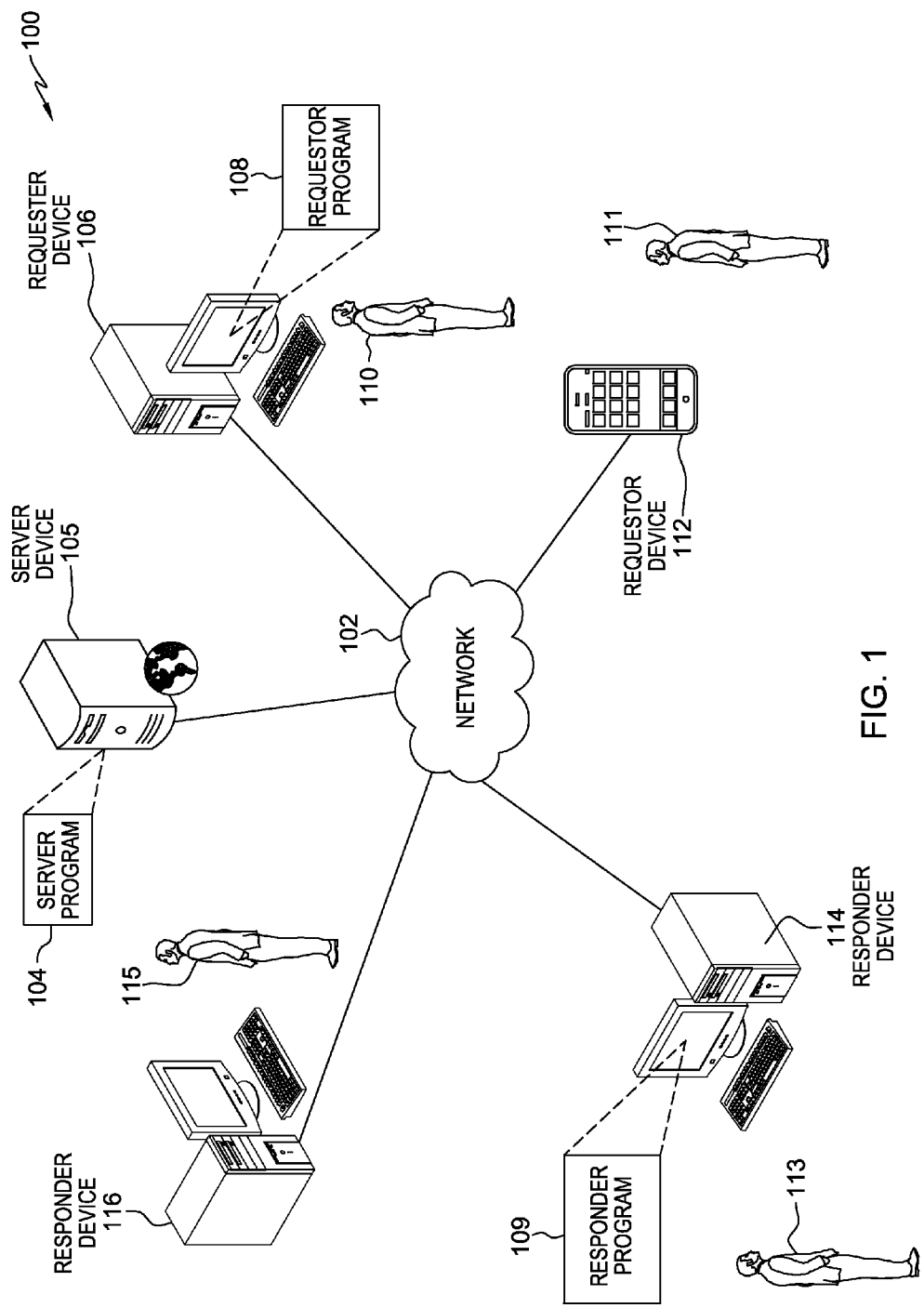
FIG. 1 is a functional block diagram of a contextual search system in accordance with embodiments of the present invention.

Further aspects of the present invention will now be described in conjunction with the figures. Referring to FIG. 1, contextual search system 100 for dynamically generating relating content based on keyword data entered or transmitted in message windows during an instant message sessions in real time is shown. Contextual search system 100 comprises network 102, requestor devices 106, 112, responder devices 114, 116 and server device 105. Requestor devices 106, 112 and responder devices 114, 116, are clients to server device 105, interconnected over network 102. Moreover, requestor devices 106, 112 and responder devices 114, 116 operate with server 105 to facilitate generation of contextual search contents during the instant messaging sessions hosted between requestors 110, 111 and responders 113, 115. Furthermore, requestor 110, 111 can be a host that initiates a request to collaboratively generate the contextual search results for display in messaging windows of the instant messaging session, conducted with responders 113, 115. In one aspect, roles of generating contextual search results in contextual search system 100 between requestors 110, 111 and responders 113, 115 can be interchangeable.

Requestor devices 106, 112 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or IPhone® (iPhone is a registered trademark of Apple Inc., in the United States, other countries, or both), respectively. Furthermore, each of requestor devices 106, 112 comprises requestor program 108. Requestor 108 can be any type of software application that is compatible to generate contextual search contents during instant messaging sessions. Responder devices 114, 116, can be, for example, a laptop, tablet, or notebook personal computer (PC), a desktop computer, a mainframe or mini computer, a personal digital assistant (PDA), or a smart phone such as a Blackberry®, respectively. Each of responder devices 114, 116 comprises an instance of responder program 109.

Server device 105 can be, for example, a server computer system such as a management server, a web server, or any other electronic device or computing system capable of receiving and sending data. Further, server device 105 can also represent a "cloud" of computers interconnected by one or more networks, where server device 105 can be a primary server for a computing system utilizing clustered computers when accessed through network 102. For example, a cloud computing system can be an implementation of contextual search system 100 for dynamically generating contextual search results based on instant message sessions between requestor 110, 111 and responders 113, 115. Server device 105 includes server program 104. Server program 104 performs all necessary functions to generate contextual search results, and transmitting of the generated contextual search results for display in the conversation window of the instant message sessions of contextual search system 100, in accordance with embodiments of the present invention.

Network 102 includes one or more networks of any kind that provides communication links between various devices and computers connected together within unstructured content redaction system 100. Network 102 can also include connections, such as wired communication links, wireless communication links, or fiber optic cables. In addition, network 102 can be implemented as a number of different types of networks, including, for example, a local area network (LAN), wide area network (WAN) or a packet switched telephone network (PSTN), or some other networked system. Furthermore, the term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web). In one aspect, content from the Internet is often provided by content servers, including, for example, server device 105 can be transmitted to client display devices, including, for example requestor devices 106, 112 and responder devices 114, 116. At the heart of the Internet is a backbone of high-speed data communication lines between major nodes or host computers, consisting of thousands of commercial, government, educational and other documents that can be transferred in a collaborative application between requestors 110, 111 and responders 113, 115, according to embodiments of the present invention.

Figure 2:
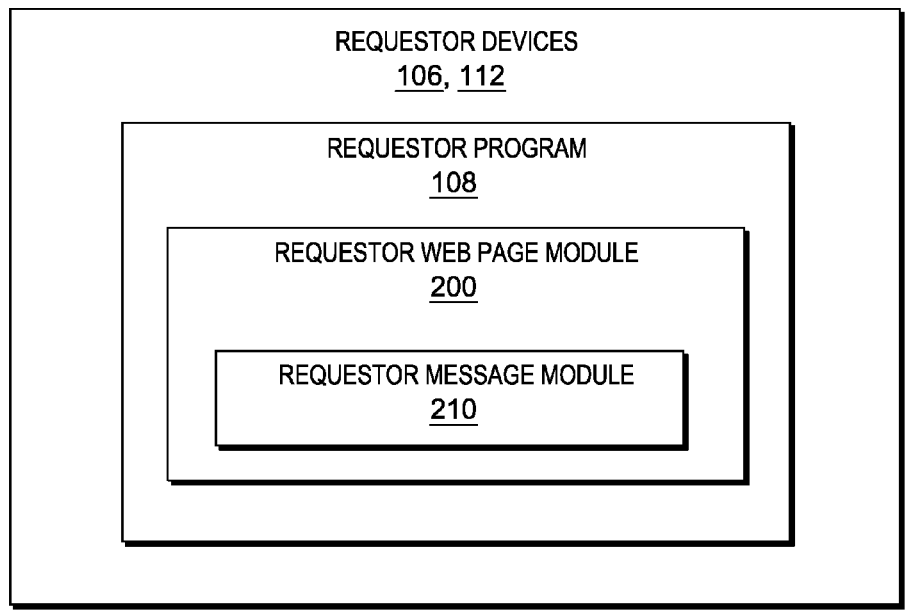
FIG. 2 is a functional block diagram illustrating program components of a requestor device, in accordance with an embodiment of the present invention.

FIG. 2 is a functional block diagram illustrating components of requestor devices 106, 112 in accordance with an embodiment of the present invention.

Requestor program 108 can, among other things, retrieve and display content accessible via network 102, such as web pages. Further, requestor program 108 is a web browser. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively. In some embodiments, requestor program 108 can be a deamon, a script, or a process. Requestor program 108 comprises requestor web page module 200.

Requestor web page module 200 is a web browser plugin/add-on that extends the functionality of requestor program 108 by adding additional user interface elements to a user interface of requestor program 108. The additional user interface elements allows requestors 110, 111 and responders 113, 115 to generate contextual search results during collaborative instant messaging sessions hosted between requestors 110, 111 and responders 113, 115.

Requestor web page module 200 comprises a web page received in requestor program 108 from server program 104 of server device 105. For example, using the additional user interface, server program 104 of server device 105 generates the contextual search results for display on requestor devices 106, 111, and/or responder devices 114, 116 during instant messaging sessions between requestors 110, 111 and responders 113, 115. The web page received in requestor program 108, includes, for example, program code, such as HyperText Markup Language (HTML) code or JavaScript code that, when executed, adds one or more user interface elements to requestor program 108.

Requestor web page module 200 further comprises requestor message program 210. Requester message program 210 is a web browser plugin/add-on that extends the functionality of requestor web page module 200 by adding additional user interface elements to a user interface of requestor web page module 200. Specifically, requestor message program 210 provides a user interface that allows either or both requestors 110, 111 or responders 113, 115 to generate the contextual search results for display on requestor devices 106, 111, or responder devices 114, 116, based on keyword data of instant messages entered in a messaging window.

Figure 3:
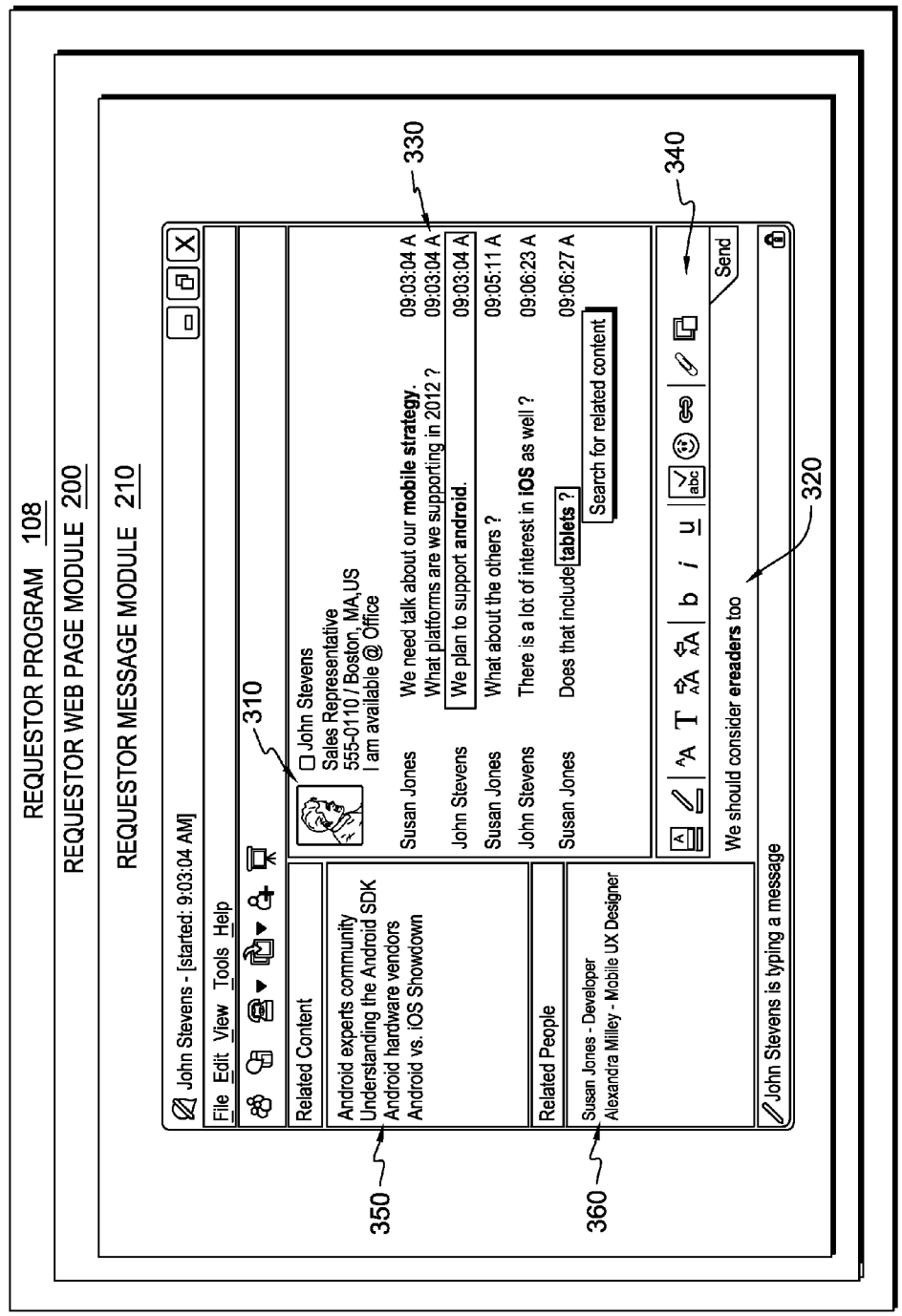
FIG. 3 is an exemplary view of user interface elements added to a user interface of requestor message module.

FIG. 3 is an exemplary view of user interface elements added to a user interface of requestor message module 210. Requestor message module 210 includes one or more of the following user interface elements, including, requestor ID 310, Message input window320, conversation window 330, messenger bar 340, related content window 350 and related people window 360.

Requestor ID 310 provides an identifier of at least one user, engaged in the instant message transaction, including, for example, requestors 110, 111 and/or responders 113, 115. Requestor ID 310 includes, for example, a name of an image or other display of remotely located responders 113, 115, with which requestors 113, 115 communicates and transmits information to generate the contextual search for display on requestor message module 210.

The image or other displays of requestor ID 310 can include, for example, a name of either of responders 113, 115 and/or requestors 110, 111, an icon that represents either of responders 113, 115 and/or requestors 110, 111, or other graphical representation either of responders 113, 115 and/or requestors 110, 111. Requestor message module 210 can also include a responder selection section (not depicted). The responder selection section can be used to by requestors 110, 111 to select responders 113, 115, to which an instant messaging chat session can be initialized.

Message input window 320 is a window editor or a message window, through which a user, including, for example, requestors 110, 111 can enter current instant messages for transmission to another user, including for example, responders 113, 115, during an instant messaging session hosted between requestor devices 106, 112, and responder devices 116, 114. Requestors 110, 111 can enter an instant message in message input window 320 using a standard keyboard, for example, and then submit the instant message to conversation window 330, for viewing by either responders 113, 115 and/or requestors 110,112.

Conversation window 330 represents conversation history between responders 113, 115 and requestors 110, 111. Conversation window 330 contains a transcript of instant messages that are dynamically exchanged between responders 113, 115 and/or requestors 110, 111. The instant messages exchanged in conversation window 330 can include identifiers to identify either responders 113, 115 and/or requestors 110, 111. For example, instant messages in conversation window 330 can be used to generate one or more related contextual results on requestor message module 210, as described in more details below, in accordance with one embodiment of the present invention.

Messenger bar 340 provides requestor message module 210 with a graphical user interface that presents a resource that is currently being shared between participants of the instant message session on requestor message module 210. Messenger bar 340 displays representations of any image, audio, video, or other types of resources that are attached to instant messages exchanged between either responders 113, 115 and/or requestors 110, 111, in accordance with embodiments of the present invention. Related content window 350 displays results of generated contextual searches based on keyword data entered in Message input window 320. Related people window 360 displays names and other identification of individuals who are identified as being related to keyword data of message input window 320.

Requestor message module 210 dynamically performs a search for key word data from the instant messages entered in Message input window 320, transmitted and displayed on conversation window 330. Further, requestor message module 210 searches for the key word data by dynamically collaborating with server program 104 of server device 105 to search a database of server device 105 that includes the instant message conversation threads of related content of instant message conversation histories stored in the database of server device 105, in accordance with embodiments of the present invention.

Furthermore, server program 104 of server device 105 correlates with requestor message module 210 to dynamically perform the search of related content that matches the keyword data of the instant messages, periodically, randomly, and/or using event-based monitoring of instant messages entered into Message input window 320 and transmitted to conversation window 330. Server program 104 further displays the monitored instant messages on conversation window 330 of requestor message module 210.

In one embodiment, the search of related content in the database that matches the keyword data is performed dynamically by requestor message module 210 as the instant messages are entered into Message input window 320. In one embodiment, the search can be performed even prior to a user, including, for example, requestors 110, 111, submitting the instant message to conversation window 330, for display to either of requestors 110, 111 and responders 113, 115, in accordance with embodiments of the present invention. For example, requestors 110, 111 could enter or type "I like my new Android phone" or "We should consider ereaders too" into Message input window 320. In this manner, as the instant message/s are entered into Message input window 320, server program 104 searches one or more database of server device 105 to dynamically identify related content of instant messages in the databases that correlate with the keyword data of instant messages in Message input window 320, in accordance with embodiments of the present invention.

In one embodiment, if a word or phrase of the instant message is recognized as a keyword data, the phrase or word is dynamically identified as such, and displayed to requestor 110, 111 in Message input window 320. For example, the phrase or word can be displayed in Message input window 320 using unique visual distinction from the other instant messages entered in message input window 320. In the illustrated example, the unique distinction, could recognize the word "ereaders" as a keyword, and display the word differently, as illustrated, in bold or a different unique format, together with the other instant messages entered in message input window 320.

Furthermore, requestor 110, 111 submits the instant message together with identified keyword data, uniquely displayed on thread window 320 to be transmitted to the instant messaging session on conversation window 330 between requestor 110, 111 of requestor device, and responders 113, 115, of responder devices 114, 116. Once the instant messages are transmitted to conversation window 330 they become part of the collaboration history of one or more instant message sessions between requestor 110, 111 and responders 113, 115. In one embodiment, the collaboration history of the one or more instant message sessions, together with any identified keyword data of the one or more instant message sessions is stored in a database of server device 105. In one embodiment, requestor message module 210 further correlates with sever program 104 to search the database of server device 105 for keyword data that are stored in the database, for reference, now or in the future, such as when the one or more instant message sessions of the collaboration history is re-opened.

Requestors 110, 111 can optionally highlight keywords of instant messages entered in Message input window 320 of the instant message sessions. Therefore, in this manner, requestor 110, 111, have the ability to indicate a desire for the highlighted keyword word to be designated as a keyword data. The highlighted words by requestor 110, 111 further allows requestor message module 210 to search for keyword data in the database of server device 105 that might not have been automatically identified as a keyword data by server program 104 of server device 105. Moreover, highlighted words by requestors 110, 111 become an attribute of words in past or present instant message sessions of the collaboration history that is stored in the database of server device 105. Moreover, the highlighted words in Message input window 320 are displayed differently from other words in the instant message thread. This alerts all participants in the instant message conversation, including, for example, requestor 110, 111 and responders 113, 115, that there is a keyword in the instant messages entered in Message input window 320 or transmitted in conversation window 330.

Furthermore, requestor message module 210 searches either or both messages in Message input window 320 or conversation window 330 for keyword data pertaining to related content of instant messages, stored in the database of server device 105. In particular, related data or content of database of the server device 105 are matched against the keyword data of Message input window 320. If a match exists of the keyword data and the related content, the match is displayed for requestor 110, 111 or responders 113, 115, for viewing during instant message sessions on conversation window 330. For example, a search may be performed for keyword "Android Phone" that is entered in Message input window320 and transmitted to conversation window 330. In this manner, related content of the keyword data of "Android" will be displayed in related content window 350. In one embodiment, as keywords are identified and displayed, requestor message module 210 correlates with server program 104 of server device 105 to search for related content of keyword data "Android".

For example, a search is performed for keyword data "Android" as the instant messages of keyword data are entered in Message input window320. Further, server program 104 performs a search for related data or content that relates to "Android" and server program 104 also searches for other related data, including, for example, to a company's procurement department's inventory related to Android phone. In depicted example, related content window 350 displays "Android experts community, Understanding the Android SDK, Android hardware vendors. Related content window 350 displays related data of keyword data of message input window320 related content window 350, for viewing by requestor 110, 111 and responders 113, 115.

Furthermore, the related data of related content window 350 is displayed based on one keyword/phrase at a time and the related content can also be uniquely displayed, specifically to requestors 110, 111 and responders 113, 115, in accordance with embodiments of the present invention. Furthermore, either the requestors 110, 111 or responders 113, 115, can select specific keyword data of instant messages to search that are correlated with related data. In particular, once the keyword is selected, related content window 350 displays related content that is related to content that is matched against keyword data of the instant message in Message input window320. Related content window 350 further displays multiple related contents of keyword data that correlates with the selected keyword of the instant messages of the dynamically identified keyword data of the instant messages by requestor message module 210.

Moreover, since dynamically identified keyword data are automatically stored in the database of server device 105, keyword searches can be automatically saved and stored in the database of server device 105 for future searches and retrieval. Further, since the search results of related content and keywords of the related content are saved, they can also be updated at any time for retrieval by requestor 110, 111 and responders 113, 115. Furthermore, the search results can also be dynamically updated based on the keyword data entered in Message input window320. The requestor message module 320 can update the keyword search based on keyword data of the instant messages in thread window, asynchronously, even if either or both or requestor 110, 111 and responders 113, 115 are not currently engaged in an instant messaging session. For example, if a requestor 108 opened a chat history a year later, and selected the "Android Phone" keyword data in an instant message of Message input window340, then server program 104 will retrieve the most up to date information relating to android phones, instead of those from a year ago. In this manner, related content window 350 will display related contents of the latest keyword search relating to "Android Phone", in accordance with embodiments of the present invention.

Figure 4:
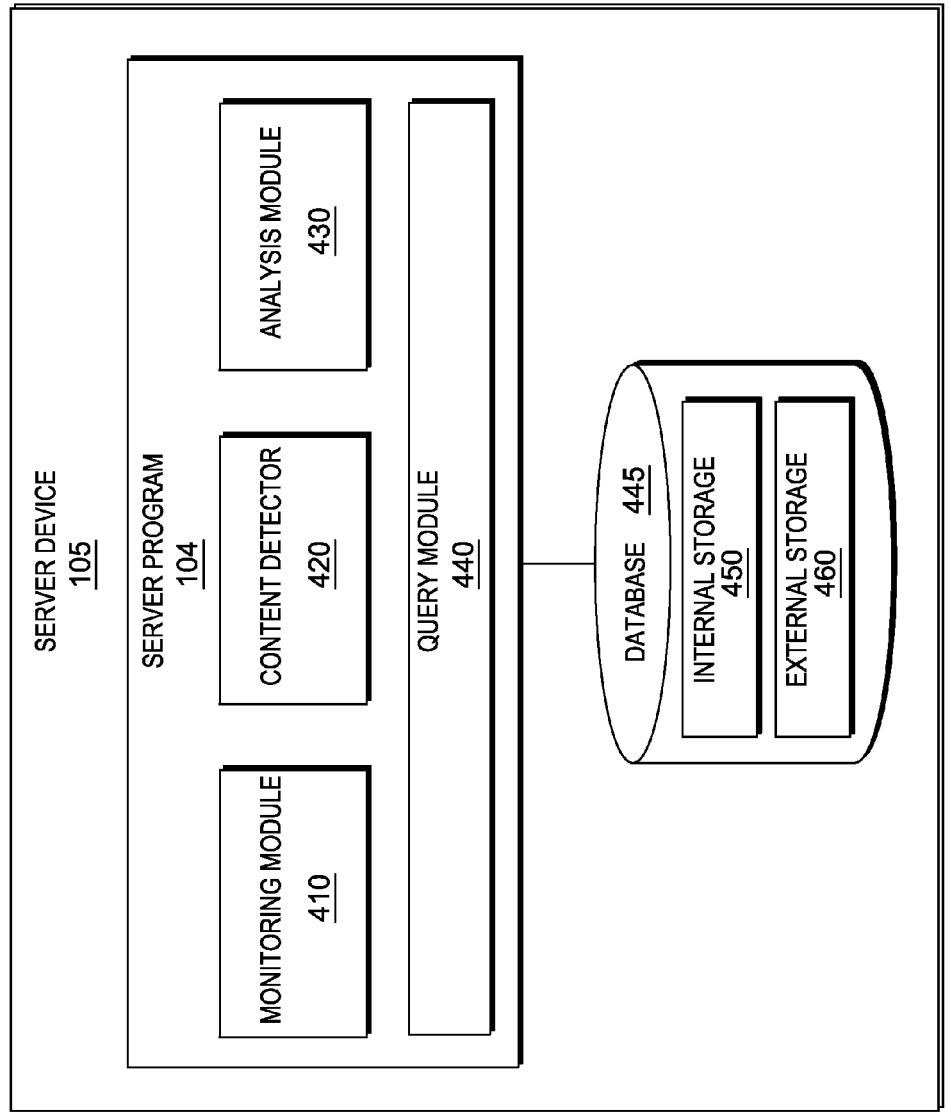
FIG. 4 is a functional block diagram illustrating program components of a server device in accordance with embodiments of the present invention.

FIG. 4 is a functional block diagram illustrating program components of a server device in accordance with embodiments of the present invention.

Sever device 105 includes server program 104 and database 410. Server program 104 performs all necessary functions to generate contextual search results based on matching against one or more keyword data and related content stored in database of server device 105.

Database 410 can be any type of storage device, storage server, storage area network, redundant array of independent discs (RAID), cloud storage device, or any type of data storage that maintains information, including collaboration history of instant messaging sessions of requestors 110, 111 and responders 113, 115. Database 410 performs operations of both an internal and an external database device. Database 320 can also be a relational database management system (RDBMS). A RDBMS is a database that stores information from documents in tables, and also defines relationships among the information in the tables, including, for example, collaboration history of instant messaging session between requestors 110, 111 and responders 113, 115. Database 410 includes internal storage 450 and external storage 460. Internal storage 420 includes locally available information from metadata and/or files associated with requestor device 106, 112 and responder devices 114, 116. Information contained in internal storage 420 includes, for example, information pertaining to collaboration history of one or more instant messaging sessions between requestor 110, 111, and responders 113, 115 in accordance with embodiments of the present invention.

Information in internal storage 450 can be files for generating contextual search results based matched between related contents and keyword data of instant messages during the instant messaging sessions, as described in more details below. In one embodiment, internal database 410 is sorted, for instance, through extraction of the files or indexing of the files. Sorting mechanism allows easy searching of for related content searched in internal database based on keyword data of the instant messages dynamically searched in message input window320 or conversation window 330 and transmitted to internal database 420 for matching against related content of the keyword data in internal database 420.

Furthermore, internal database 420 also stores locally available information pertaining to requestor program 108 of requestor device 106, 112 or responder program 109 of responder devices 114, 115. The locally available information can include collaboration history of instant messaging sessions conducted over network 102, internet cache, and/or internet browsing history, that relates to information searched or saved over network 102. Further, the types of information available in internal database 420 include content of keywords that are automatically or manually searched in requestor message module 210 of requestor program 108. The content can be specifically related to keyword data that is dynamically searched in message input window 320 of requestor message module 210. For example, "Android" a keyword data search in requestor message module 210, can include information relating to "Android" that is stored in internal database 420, in the case, the related information of "Android" that is stored in internal database 420 can include, for example, "Android experts community understanding the Android SDK Android hardware vendors", as described above. In this manner, the related information is locally stored in internal database 420, and also the related information is correlated to keyword data "Android", in the event that the keyword data is manually or automatically searched in requestor message module 210. External database 440 includes information from Internet sources, including for example, search engines, or other Internet sources with information that can relate to keyword data in requestor message module 210. The information in external database 440 can also be derived from private or subscription databases, a remote user or machine, and the like, in accordance with embodiments of the present invention.

Server program 104 includes monitoring module 410, content detector 420, analysis module 430 and query module 440. Monitoring module 410 monitors instant messages entered by requestors 110, 111 in Message input window 320 periodically, randomly, and/or using event-based monitoring for keyword data that are automatically or manually searched based on related data in database 410. Monitoring module 410 also monitors messages transmitted in conversation window 330. Monitoring module 410 receives information from requestor program 108 that details or describes requestor interactions during the instant message session between requestor 110, 111 and responders 113, 115. In particular, monitoring module 410 monitors the instant messages as they are typed into message input window 320, and/or as they appear in Message input window 320 prior to requestors 110, 111 sending or transmitting the message to conversation window 330. Content detector 420 monitors keyword data of instant messages are they are entered Message input window 320. Content detector 420 dynamically searches either or both internal database 450 or external database 460 for related content that matches the keyword data. Analysis module 430 analyzes all matched keyword data against related content of the keyword data in either of internal database 450 or external database 460 by content detector 420. Analysis module 430 also generates related contents that match the keyword data based on the match. Analysis module 430 generates the match based on phrases, subject matter, and other specific components that are related to keyword data of the instant messages based on relationships between the keyword data of the instant message typed in Message input window 320 of requestor message module 210. The related content of the keyword data is stored in internal storage 450 or external storage 460.

Analysis module 430 generates contextual search results based on the match, and transmits the generated contextual search results to related content window 350 for display in requestor message module 210. Analysis module 430 can utilize a Hidden Markov Model to generate the contextual search results. Hidden Markov Models provide probabilities of predicting related content in internal storage 450 and external storage 460 that matches keywords entered in Message input window 320. The Hidden Markov mechanism can further provide statistical information associated with instant message sessions between requestors 110, 111 and responders 113, 115. The statistical information can include frequency, history, ratings, preference settings, and the like, that relates to the instant messaging session between requestor and participants.

Query module 440 utilizes the matched related contents against the keywords by analysis module 430 to generate contextual search terms for display in related content window 350 in requestor message module 210 of requestor devices 106, 112. Query module 440 uses APIs or other database-specific semantics, including, for example, SQL commands to communicate with analysis module 430, and generation of the contextual search terms. For example, query module 440 transmits the generated contextual search terms to related content window 350 of requestor message module 210 for display to requestor 110, 111 or responders 113, 115 during instant message sessions. In one embodiment, query module 440 can also store the generated search content in database 410 in the event that either or both requestor 110, 111 or responders 113, 115 are not engaged in the instant messaging session.

Figure 5:
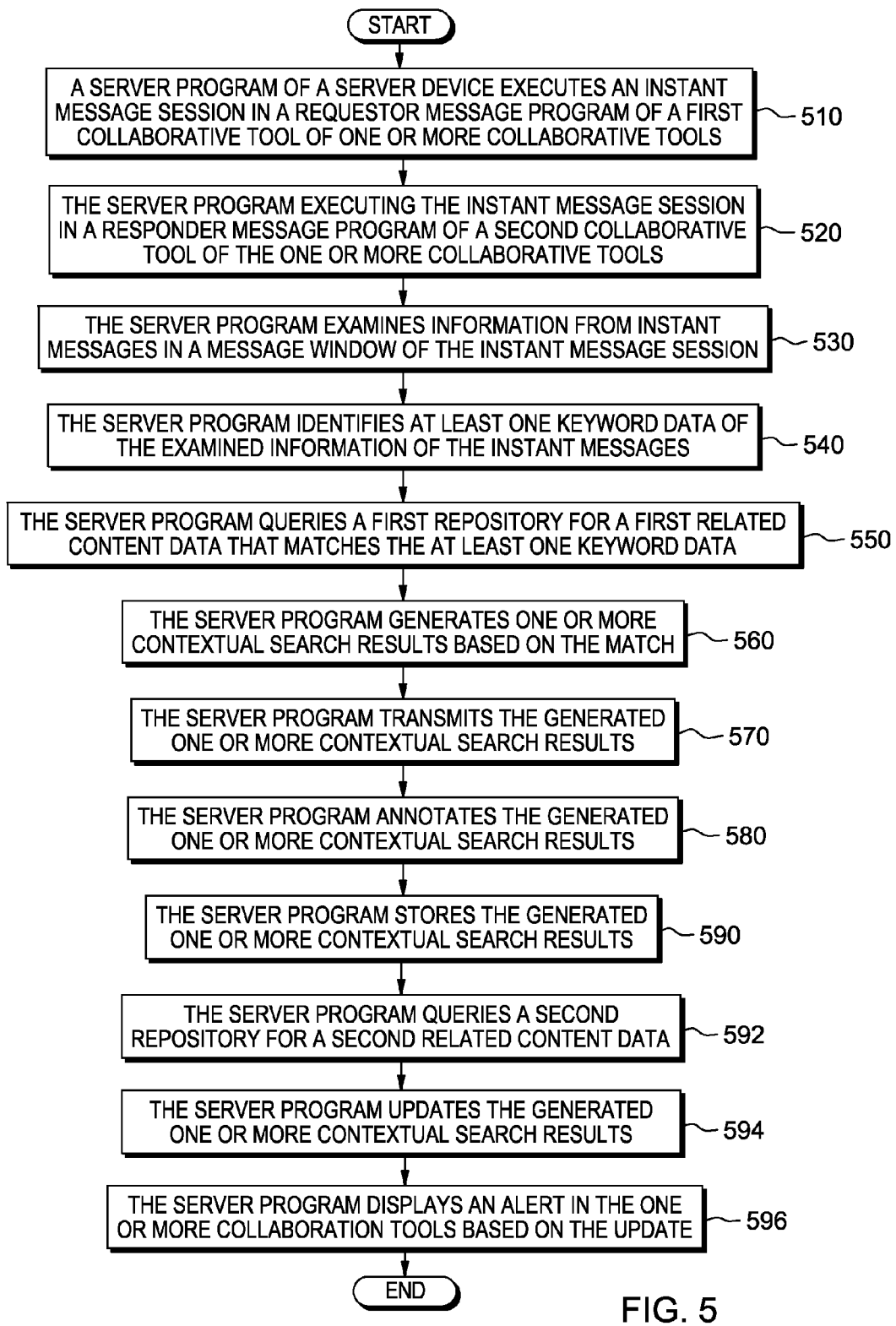
FIG. 5 is a flowchart depicting steps performed by a server program of a server device in accordance with embodiments of the present invention.

FIG. 5 is a flowchart depicting steps performed by server program 104 of server device 105 of FIG. 1, in accordance with embodiments of the present invention. In step 510, server program 104 executes an instant message session in requestor program 108. In step 520, server program 104 executes the instant message session in a responder program 109. In step 530, server program 104 examines information from the instant messages in requestor message module 210. In step 540, server program 104 identifies at least one keyword data of the examined information of the instant messages. In step 540, server program 104 identifies at least one keyword data of the examined information of the instant messages. In step 550, server program 104 queries internal storage 450 for a first related content data that matches the at least one keyword data. In step 560, server program 104 generates one or more contextual search results based on the match. In step 570, server program 104 transmits the generated one or more contextual search results to either of requestor devices 106, 112 or responder devices 113, 115. In step 580, server program 104 annotates the generated one or more contextual search results of the display in either of requestor devices 106, 112 or responder devices 113, 115. In step 590, server program 104 stores the generated one or more contextual search results in database 410 of the instant message session. In step 592, server program 104 queries external storage 460 for a second related content data that matches the at least one keyword data. In step 594, server program 104 updates the generated one or more contextual search results with the queried second related content data that matches the at least one keyword data. In step 596, server program displays an alert in either of requestor devices 106, 112 or responder devices 113, 115, wherein the alert indicates the availability of the update to the generated one or more contextual search results.

Figure 6:
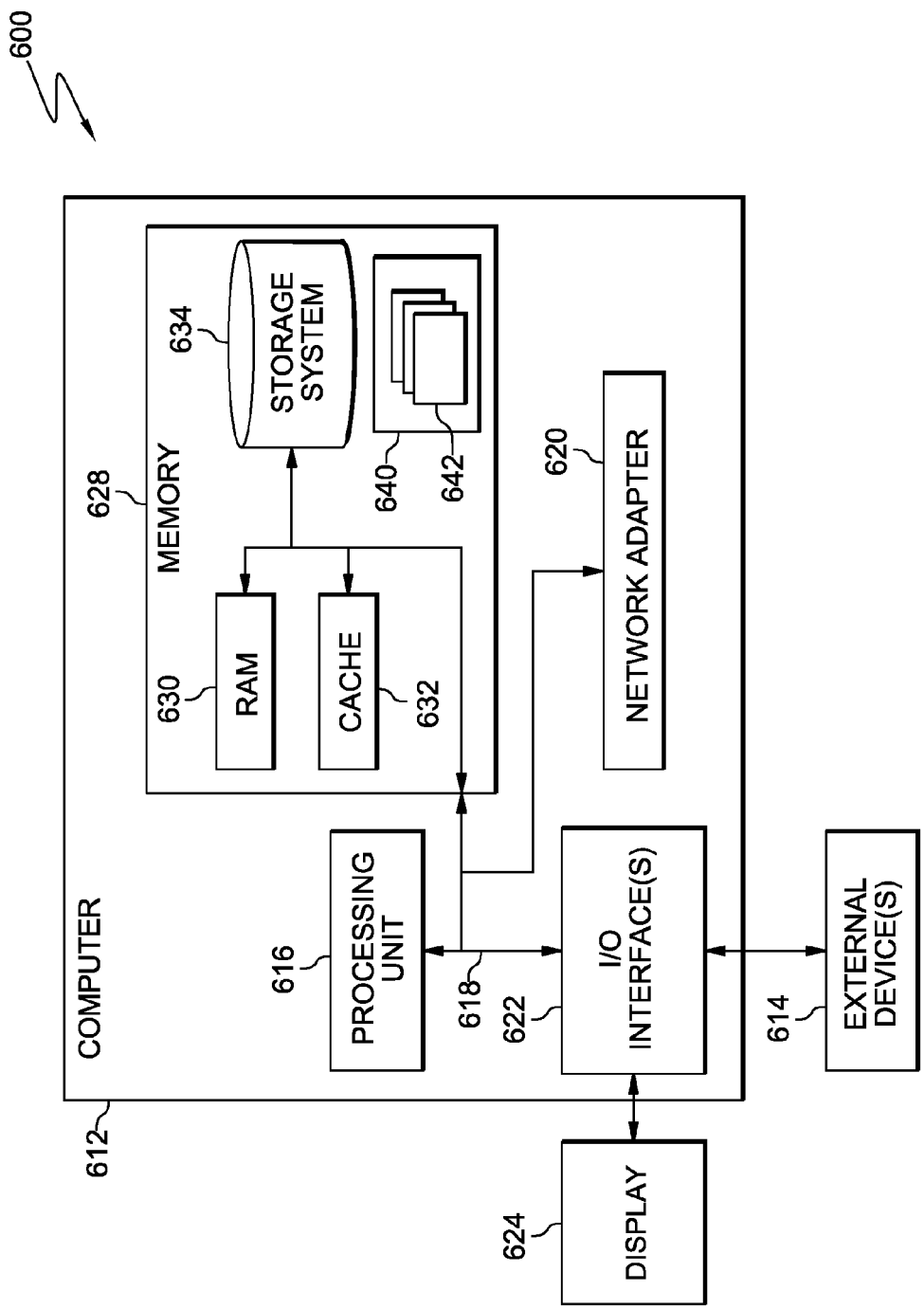
FIG. 6 illustrates a block diagram of components of a computer system in accordance with embodiments of the present invention.

FIG. 6 is a functional block diagram of a computer system, in accordance with an embodiment of the present invention.

Computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In computer system 600 there is computer 612, which is operational with numerous other general purpose or special purpose computing system environments or configurations. Examples of well-known computing systems, environments, and/or configurations that may be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of requestor devices 106, 112, responder devices 113, 115 and server device 105 can include or can be implemented as an instance of computer 612.

Computer 612 may be described in the general context of computer system executable instructions, such as program modules, being executed by a computer system. Generally, program modules may include routines, programs, objects, components, logic, data structures, and so on that perform particular tasks or implement particular abstract data types. Computer 612 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 6, computer 612 is shown in the form of a general-purpose computing device. The components of computer 612 may include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media may be any available media that is accessible by computer 612, and includes both volatile and non-volatile media, and removable and non-removable media.

Memory 628 includes computer system readable media in the form of volatile memory, such as random access memory (RAM) 630 and/or cache 632. Computer 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Requestor program 108, responder program 109, and server program 104 can be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Each one of requestor program 108, responder program 109 and server program 104 are implemented as or are an instance of program 640.

Computer 612 may also communicate with one or more external devices 614 such as a keyboard, a pointing device, etc., as well as display 624; one or more devices that enable a user to interact with computer 612; and/or any devices (e.g., network card, modem, etc.) that enable computer 612 to communicate with one or more other computing devices. Such communication occurs via Input/Output (I/O) interfaces 622. Still yet, computer 612 communicates with one or more networks such as a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components could be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product generating related content during an instant message communication between collaborative tools has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for generating related content during an instant message communication between collaborative tools within a computer system, the method comprising:
executing an instant message session in a requestor message program of a first collaborative tool of one or more collaborative tools between one or more users of the one or more collaborative tools;
executing the instant message session in a responder message program of a second collaborative tool of one or more collaborative tools;
examining information from instant messages in a message window during the instant message session;
automatically identifying at least one keyword data of the examined information, wherein the examined information is dynamically analyzed prior to submission of the instant messages in the message window of one or more collaborative tools, and wherein the examined information is dynamically analyzed as it is entered in the message window, and wherein the at least one keyword data is automatically identified with distinctive text formats, and displayed in the message window based on the dynamically analyzed examined information;
highlighting the at least one keyword data based on a desire to designated the highlight at least one keyword data as a keyword data of the examined information, wherein the highlighted at least one keyword data is manually identified as the keyword data of the examined information;
submitting the automatically identified at least one keyword data and the highlighted at least one keyword data as a collaborative instant message session history in a first query repository of the instant message session;
querying a first repository for the first related content data that matches the at least one keyword data;
generating one or more contextual search results based on the match;
transmitting the generated one or more contextual search results for display on the one or more collaboration tools;
annotating the generated one or more contextual search results of the display on the one or more collaboration tools, wherein the annotated one or more contextual search results are displayed with distinctive text formats in the message window of the one or more collaborative tools;
storing the generated one or more contextual search results in a storage of the instant message session;
querying a second repository for a second related content data that matches the at least one keyword data, wherein the query for the second related content data is automatically performed during automatic identification of the at least one keyword data and the highlighted at least one keyword data of the instant messages in the message window;
updating the generated one or more contextual search results with the queried second related content data that matches the at least one keyword data, wherein the updated generated one or more contextual search results of the queried second related content data is annotated and displayed in a related content window of the one or more collaborative tool; and
displaying an alert in the related content window of the one or more collaboration tools, wherein the alert indicates the availability of the update to the generated one or more contextual search results.

2. The method of claim 1, wherein the manually selected at least one keyword data as the keyword data on the one or more collaborative devices.

3. The method according to claim 1, wherein the message window is a message input window or a message conversation window of the requestor program or the responder program, and wherein the at least one keyword data is displayed in either of the message input window or the conversation window of the message window.

4. The method according to claim 1, wherein the first repository is an internal database and wherein the second repository is an external database.

5. The method according to claim 1, wherein the step of generating one or more contextual search results based on the match further comprises: updating the contextual search results stored in one or more repositories, and wherein the contextual search results are asynchronously updated.

* * * * *